H. D. WEED.
ANTISKIDDING DEVICE FOR VEHICLE WHEELS.
APPLICATION FILED JUNE 3, 1915.

1,253,113.  Patented Jan. 8, 1918.

Witnesses:
Charles Eberhart
Jessie B. Kay

Inventor
Harry D. Weed
By his Attorney
Harry H. Duncan

UNITED STATES PATENT OFFICE.

HARRY D. WEED, OF SYRACUSE, NEW YORK, ASSIGNOR, BY MESNE ASSIGNMENTS, TO AMERICAN CHAIN COMPANY, INCORPORATED, OF BRIDGEPORT, CONNECTICUT, A CORPORATION OF NEW YORK.

ANTISKIDDING DEVICE FOR VEHICLE-WHEELS.

1,253,113.  Specification of Letters Patent.  Patented Jan. 8, 1918.

Original application filed November 19, 1907, Serial No. 402,778. Divided and this application filed June 3, 1915. Serial No. 31,801.

*To all whom it may concern:*

Be it known that I, HARRY D. WEED, formerly a resident of Canastota, and now a resident of Syracuse, in the county of Onondaga, State of New York, have made a certain new and useful Invention Relating to Antiskidding Devices for Vehicle-Wheels, of which the following is a specification, taken in connection with the accompanying drawings, which form a part of the same.

This application is based upon and is a division of my co-pending application Serial No. 402,778, filed November 19, 1907.

This invention relates to certain improvements in anti-skidding devices for vehicle wheels having multiple tires, and is particularly adapted for use in connection with dual tires with which the wheels, and especially the traction wheels, of many self-propelled vehicles are now equipped.

These tires are usually made of solid rubber and are secured side by side some distance apart transversely upon the periphery of the rim or felly of the wheel leaving an annular space between the adjacent faces of the tires.

My main object is to provide a simple, practical and efficient grip-tread which may be easily and quickly applied to or removed from the periphery of both tires simultaneously, and held in place by attaching elements within the wearing surfaces of the gripping elements. In other words, I have sought to utilize the annular space between the tires for the reception of the attaching elements as well as portions of the gripping elements, which are depressed into said space.

Another object is to provide means also located within the annular groove or space between the tires for taking up the slack of the grip-tread.

A further object is to make the attaching elements located within the annular space separate from the tires so that the entire grip-tread may be free to shift circumferentially relatively to the tires, and still be guided or held in operative position against transverse displacement by the portions of the gripping elements which may be located in such annular space.

In the illustrative drawings showing in a somewhat diagrammatic way an illustrative example of my invention, Figure 1 is a side elevation partly in section showing a form of the improved antiskidding device applied to a dual tire vehicle wheel.

Figure 1:
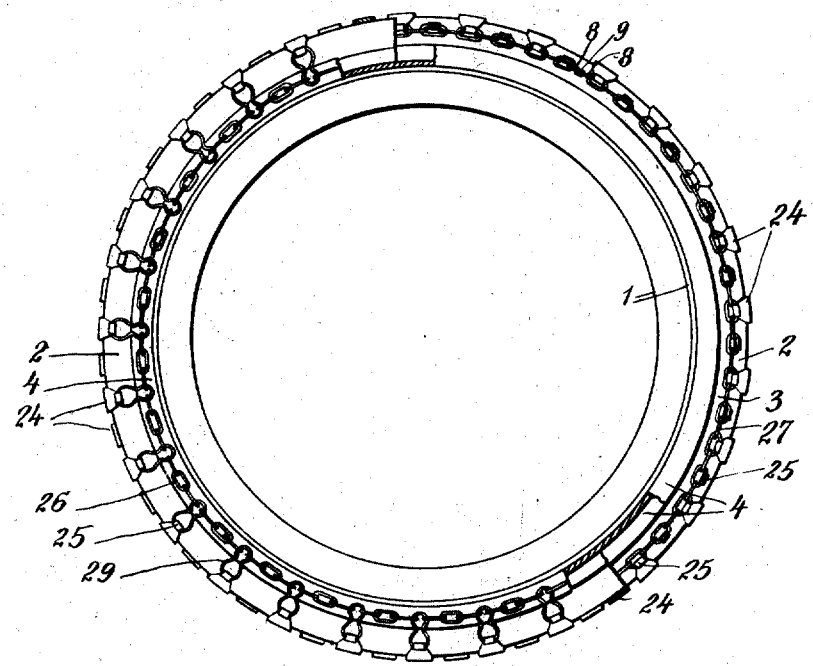
Figure 2:
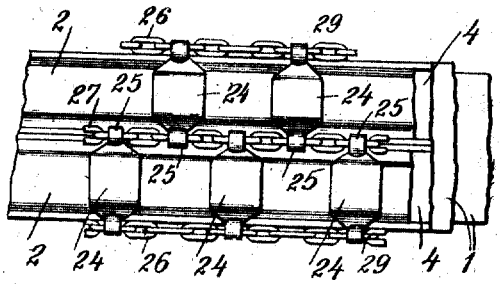
Fig. 2 is a top plan view of a portion of the wheel and device.

In all of these several views, I have shown a vehicle wheel comprising a rim 1, upon which is mounted a pair of solid rubber, or elastic tires 2 spaced apart forming an intervening annular groove 3, the tires 2 being separate and preferably seated in separate channel rings 4 forming a part of the main rim 1, although in some instances, these tires 2 may be united at the bases of their meeting edges by a comparatively thin web of the same material.

These dual tires are of the same diameter and their peripheries are preferably flat transversely, and while they serve, in a measure, to prevent skidding of the wheels on dirt pavements, they are nevertheless susceptible to the same sliding or skidding difficulties as are experienced in the use of single pneumatic tires, and in order to overcome this liability I have provided separately constructed anti-skidding devices or grip-treads, consisting in the form illustrated of a plurality, in this instance, two circular series of wearing plates or sheet metal tread members 24, one series for each of the tires 2, those of each series being loosely applied to the periphery of their respective tire and formed at their meeting ends with attaching hooks or eyes 25 for receiving circular attaching elements 26 and 27. The plates of one series of these gripping plates 24 are staggered with, or in other words, are located opposite the spaces between those of the other series and their attaching ends are depressed within their wearing surfaces so that the attaching elements 26 and 27 are located within said wearing surfaces.

Figure 3:
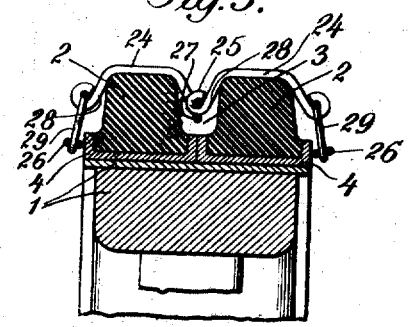
Fig. 3 is a transverse sectional view thereof.

The inner depressed ends of the plates of each series are located within the annular grooves or recesses 3 between the tires, as best seen in Fig. 3, and the circular attaching element 27 is also located within said groove or space, and usually consists of a chain having its links attached to the inwardly depressed hook-shaped attaching ends 25 of the plates 24, which ends are thereby brought into circumferential alinement some distance within the wearing surfaces and are held in place by a circular chain 27, while their outer ends are similarly held by the circular chains 26, preferably loosely engaging with or held in alinement by the sides of the wheel rim so as to assist in this way in maintaining the lateral alinement of the grip on the tire. Suitable connecting links 29 may as illustrated be used to connect the outer attaching hooks 25 to the side chains 26 and it is desirable to form the tread members 24 with substantially flat tread portions in engagement with the tire tread and with inwardly projecting angular securing flanges or portions 28 flaring out away from the sides of the tire as illustrated so as to minimize cutting or wear thereon. The chains or attaching members may have their ends adjustably secured by any suitable securing device such as the special link and adjusting nut 9 shown in Fig. 1.

Many other modifications or different forms of the gripping elements and attaching elements therefor, may be used, the invention not being of course limited to the particular forms, arrangements or proportions illustrated or described, since what is claimed is:

1. In combination with the rim of a vehicle wheel and an elastic tire having multiple treads spaced apart to form an intervening annular groove and having substantially flat tread faces, of an anti-skidding device comprising two staggered series of sheet metal tread members in the form of substantially rectangular gripping plates having substantially flat portions to engage the flat tire treads and having inwardly projecting angularly arranged securing flanges flaring out away from the sides of the tire to minimize cutting or wear thereon, and integral attaching hooks on said plates depressed within the wearing portion of the tread members, a chain attaching member located in the annular groove between the tire treads and secured to the central series of attaching hooks located within said groove and outer chain attaching members connected to said outer attaching hooks and located substantially opposite the wheel rim to assist in alining said gripping plates.

2. In combination with the rim of a vehicle wheel and an elastic tire having multiple treads spaced apart to form an intervening annular groove and having substantially flat tread faces, of an anti-skidding device comprising two series of metal tread members in the form of gripping plates having substantially flat portions to engage the flat tire treads and having inwardly projecting angularly arranged securing flanges flaring out away from the sides of the tire to minimize cutting or wear thereon, and integral attaching hooks on said plates depressed within the wearing portion of the tread members, a chain attaching member located in the annular groove between the tire treads and secured to the central series of attaching hooks located within said groove and outer chain attaching members connected to said outer attaching hooks.

3. In combination with the rim of a vehicle wheel and an elastic tire having multiple treads spaced apart to form an intervening annular groove and having substantially flat tread faces, of an anti-skidding device comprising two staggered series of sheet metal tread members forming gripping plates having substantially flat portions to engage the flat tire treads and having inwardly projecting angularly arranged securing flanges flaring out away from the sides of the tire, and integral attaching portions on said plates depressed within the wearing portion of the tread members, a chain attaching member located in the annular groove between the tire treads and secured to the central series of attaching portions located within said groove and outer chain attaching members connected to said outer attaching portions and located substantially opposite the wheel rim to assist in alining said gripping plates.

4. In combination with the rim of a vehicle wheel and an elastic tire having multiple treads spaced apart to form an intervening annular groove and having substantially flat tread faces, of an anti-skidding device comprising two series of tread members forming gripping plates having substantially flat portions to engage the flat tire treads and having inwardly projecting angularly arranged securing flanges flaring out away from the sides of the tire, and integral attaching portions on said plates depressed within the wearing portion of the tread members, an attaching member located in the annular groove between the tire treads and secured to the central series of attaching portions located within said groove and outer attaching members connected to said outer attaching portions.

5. In anti-skidding devices for multiple tread elastic tires having an annular groove between substantially flat tread faces, two staggered series of sheet metal tread members forming substantially rectangular gripping plates having substantially flat portions to engage the flat tire treads and having inwardly projecting angularly arranged securing flanges to flare out away from the sides of the tire and minimize cutting or wear thereon, and integral hook attaching portions on said plates depressed within the wearing portion of the tread members, a chain attaching member to be located in the annular groove between the tire treads and secured to the central series of attaching portions and outer chain attaching members connected to said outer attaching portions to be located substantially opposite the wheel rim to assist in alining said gripping plates.

6. In anti-skidding devices for multiple tread elastic tires having an annular groove between the substantially flat tread faces, two series of metal tread members forming gripping plates having substantially flat portions to engage the flat tire treads and integral attaching portions on said plates depressed within the wearing portion of the tread members, a chain attaching member to be located in the annular groove between the tire treads and secured to the central series of attaching portions and outer chain attaching members connected to said outer attaching portions to be located substantially opposite the wheel rim to assist in alining said gripping plates.

7. In anti-skidding devices for multiple tread elastic tires having an annular groove between the tread faces, two series of metal tread members forming gripping plates to engage the flat tire treads, and integral attaching portions on said plates depressed within the wearing portion of the tread members, an attaching member to be located in the annular groove between the tire treads and secured to the central series of attaching portions and outer attaching members connected to said outer attaching portions.

HARRY D. WEED.

Witnesses:
 AUSTIN KELLER,
 C. H. SANDFORD